United States Patent
Pawson et al.

(10) Patent No.: US 6,323,421 B1
(45) Date of Patent: Nov. 27, 2001

(54) RACEWAY SYSTEM WITH SEPARATED WIREWAYS FOR POWER AND DATA COMMUNICATION CONDUCTORS

(75) Inventors: Steven E. Pawson, Middletown; Salvatore A. Cancellieri, Plainville; Yesfim Shapiro, Rocky Hill, all of CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

(21) Appl. No.: 09/444,481

(22) Filed: Nov. 19, 1999

(51) Int. Cl.[7] ........................................... H02G 3/04
(52) U.S. Cl. ..................... 174/48; 174/49; 174/68.1; 439/114; 52/220.1; 52/220.3
(58) Field of Search ................. 174/48, 49, 68.1, 174/68.3, 97, 72 A; 220/3.3, 3.9; 52/287.1, 220.3, 220.8, 220.1; 439/113, 114, 211

(56) References Cited

U.S. PATENT DOCUMENTS

| | | | |
|---|---|---|---|
| 1,817,034 | 8/1931 | Hotchkin . | |
| 3,786,171 | 1/1974 | Shira . | |
| 4,017,137 * | 4/1977 | Parks . | |
| 4,286,630 | 9/1981 | Happer . | |
| 4,952,163 | 8/1990 | Dola et al. . | |
| 4,990,722 | 2/1991 | Benito Navazo . | |
| 5,024,614 | 6/1991 | Dola et al. . | |
| 5,039,827 * | 8/1991 | Harmon | 174/48 |
| 5,086,194 | 2/1992 | Bruinsma . | |
| 5,134,250 | 7/1992 | Caveney et al. . | |
| 5,235,136 | 8/1993 | Santucci et al. . | |
| 5,336,849 | 8/1994 | Whitney . | |
| 5,359,143 | 10/1994 | Simon . | |
| 5,523,529 * | 6/1996 | Holliday | 174/101 |
| 5,594,205 | 1/1997 | Cancellieri et al. . | |
| 5,614,695 | 3/1997 | Benito Navazo . | |
| 5,792,992 | 8/1998 | Handler . | |
| 5,861,576 | 1/1999 | Langston et al. . | |
| 5,942,724 * | 8/1999 | Russo et al. | 174/48 |
| 6,072,121 * | 6/2000 | Penczak et al. | 174/48 |

* cited by examiner

Primary Examiner—Dean A. Reichard
Assistant Examiner—Dhiru R Patel
(74) Attorney, Agent, or Firm—McCormick, Paulding & Huber LLP

(57) ABSTRACT

Raceway base and cover components define top and bottom wireway channels, and provide a third channel therebetween for housing various outlet devices that need not be placed in the wireway channels. The dividers defining these channels are molded as part of the base, and define hinge lines so that shelf defining doors can be opened for ease of wiring the raceway, and closed for isolating the cabling contained therein. Device brackets are snapped into the third channel and these device brackets are designed to receive the outlet devices as a result of a snap-in feature disclosed in a prior art U.S. Pat. No. 5,594,205.

23 Claims, 15 Drawing Sheets

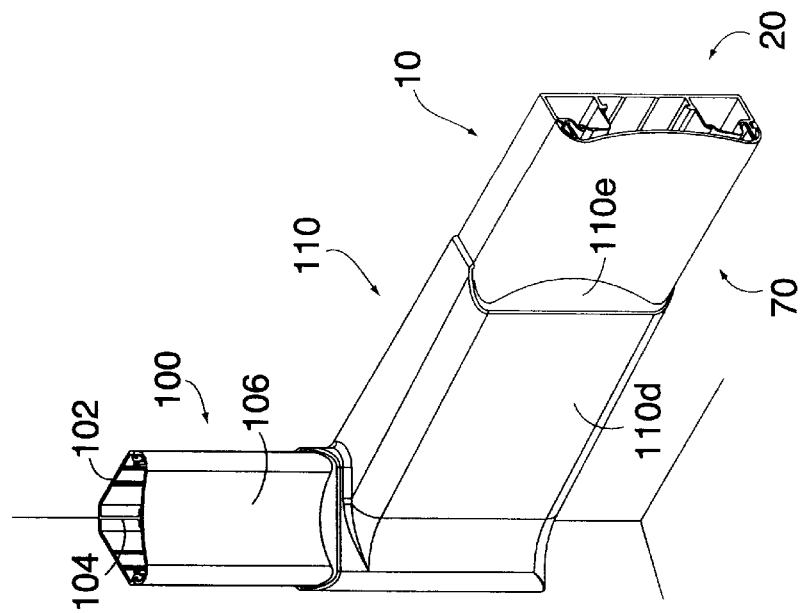
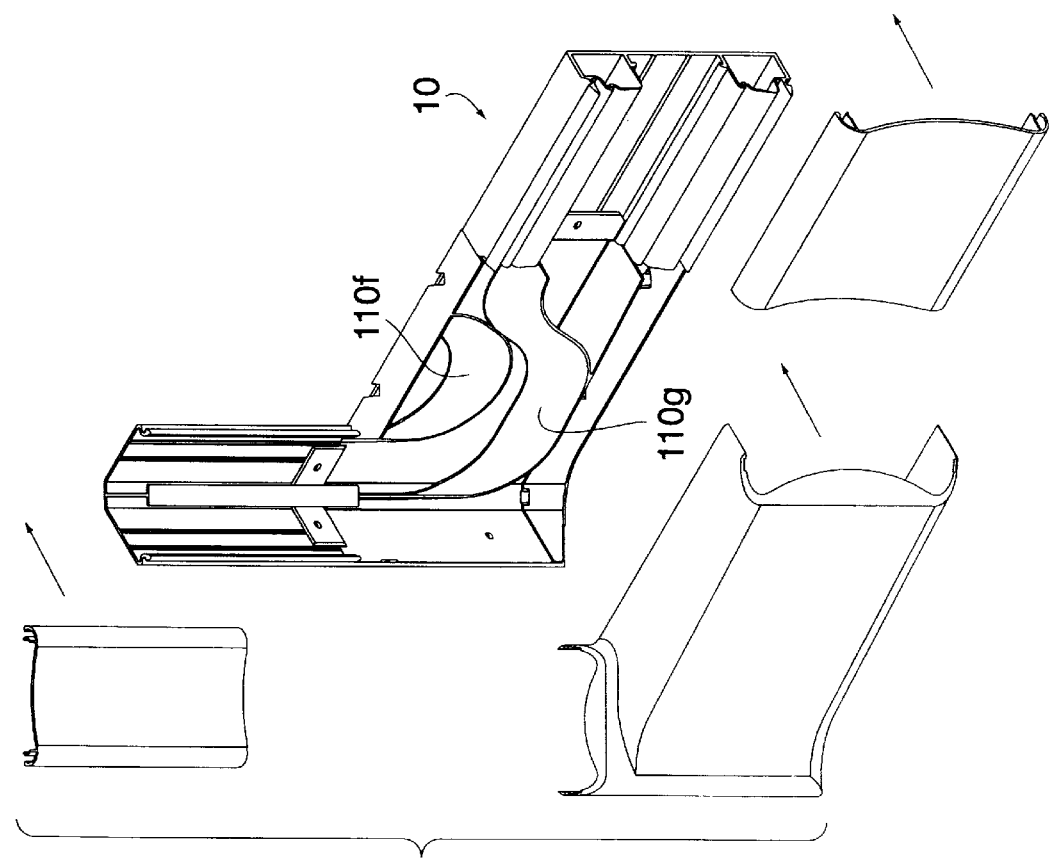
FIG. 2
FIG. 2A

RACEWAY SYSTEM WITH SEPARATED WIREWAYS FOR POWER AND DATA COMMUNICATION CONDUCTORS

BACKGROUND OF THE INVENTION

This invention relates generally to raceway systems of the type which are adapted to be wall mounted, and which carry both data and communication wiring as well as other communication conductors such as fiber optic cabling or the like. More particularly, the present invention relates to an improved raceway system having widely separated data communication channels and power channels in the raceway.

Typical prior art raceway systems provide separate channels for data communication and for power lines as shown in U.S. Pat. No. 5,336,849. However, such raceway systems generally provide contiguous channels for the power and data communication lines rather than separating these wireway channels to prevent interference, particularly electramagnetic interference from the power lines into the data lines. Data signals can be corrupted by transient spikes from the power lines that are coupled to the data lines.

In such prior art raceway systems as that shown in the above-identified '849 patent, provision is made for devices and connections to and from the conductors in each of these separate channels within the channel itself. For example, and with particular reference to FIG. 1 of the '849 patent, it will be apparent that an electrical outlet plug must be mounted in an associated bracket, which bracket is in turn provided in the base of the raceway with the result that the cross sectional area of the raceway channel that is available for the through conductors is severely limited. It is an important feature of present day raceways that many such outlet plugs and other connectors be made available in closely spaced relationship along the elongated raceway. Consequently, the reduction in cross section for wiring has led to larger raceways.

In order to alleviate this problem of reducing the cross sectional area of the raceway channels by providing devices in the raceway, raceway manufacturers generally have resorted to increasing the depth of the raceway as suggested in U.S. Pat. No. 5,086,194, for example, with the result that the raceway protrudes unnecessarily into the space defined by the wall structure on which the raceway is to be provided.

Typical prior art raceway systems which fail to leave adequate room for installing devices in the raceway to meet present day demands is shown in U.S. Pat. No. 5,024,614. FIG. 14 of this disclosure in the '614 patent shows the lack of space afforded for installing the devices when the raceway or wireway channels are provided with a cable density for which they are designed. As a result of taking up virtually the entire raceway cross section no space is afforded for installation of the devices in the channels without cramming the cables into their associated raceways.

Still another solution to this problem is suggested in U.S. Pat. No. 4,952,163 wherein the outlet device is provided in a protrusion that extends outwardly from the channel defining portion of the raceway itself. See for example FIG. 2 of the '163 patent where the depth of the raceway is more than doubled as a result of installing an electrical device outside the channels carrying the raceway wiring.

SUMMARY OF THE INVENTION

The foregoing disadvantages of the prior art are overcome as a result of the present invention by providing the data and communication lines power lines in separated channels of the raceway, and creating a third channel therebetween for accommodating both the electrical devices used with the power lines, and data communication sockets or jacks of the type used with fiber optic cabling or data and telecommunication wiring.

In accordance with the present invention, an elongated raceway is provided having longitudinally extending base elements, each of which has a rear wall adapted for mounting to an existing wall structure, either directly to the studs of the wall, or to the wall cover material generally provided on these studs. The raceway base elements include marginal edge portions that define upper and lower boundaries respectively of top and bottom raceway channels, respectively. Raceway dividers are provided in the base, as well, and these define a third elongated channel which is wide enough to accommodate present day electrical devices such as a duplex outlet plug or other standard electrical device of current or anticipated standard dimensions.

The dividers further define elongated shelf defining doors which are integrally formed with the dividers themselves and preferably with the raceway base. These elongated shelves or doors are integrally connected to the dividers by hinge lines, and the raceway dividers and/or the shelves are provided with lines of weakening for shearing segments thereof to allow wiring from each of the top and bottom raceways to be fed into the center channel for connection to electrical devices mounted therein.

The present invention provides a unique mounting system for the electrical device or other devices to be installed in the center or third channel of the raceway. More particularly, the bracket is designed with readily deformable wing portions that define abutment surfaces which interact with ribs provided for this purpose in the raceway base so as to permit snap-in assembly of the device bracket. The device bracket itself is so constructed as to receive the device in a snap-in assembly step as suggested in prior art U.S. Pat. No. 5,594,205 issued to the assignee herein and incorporated by reference herein.

In the preferred embodiment, the cover components of the raceway assembly define a concave external or front contour which affords maximum cross section for the channels carrying the power lines and other cabling, but which affords only the necessary space for accommodating the devices to be installed in the center or third channel. Actually, the device may protrude slightly from this third channel through an opening provided for this purpose in the concave cover of the raceway, and a trim plate is designed to fit the concave contour of the raceway and yet afford a generally flat configuration for the raceway at the spaced locations for the various electrical devices.

The concave configuration of the raceway cross section affords a maximum depth in the area of the wireway channels. This geometry not only allows for optimal wire fill capacity, but also affords an increase in the bend radius for these wires at both internal and external corner L-shaped elbow connectors. Such a feature has added advantages where fiber optic cabling is carried in one of these channels.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 2 shows the same linear raceway system but with a vertical drop provided to one end of the linear raceway system of FIG. 1 at a corner of the wall structure.

FIG. 2a shows the structure of FIG. 2, but with the various cover components depicted in an exploded relationship to one another.

FIG. 4d is an exploded view of the raceway ceiling drop depicted in FIG. 4a.

FIG. 4e is an exploded view of the raceway the as depicted in FIGS. 2 and 2a.

FIG. 10 is a rear view of the device bracket of FIG. 9 showing a section line C—C on which FIG. 9 is taken.

DETAILED DESCRIPTION

Figure 1:
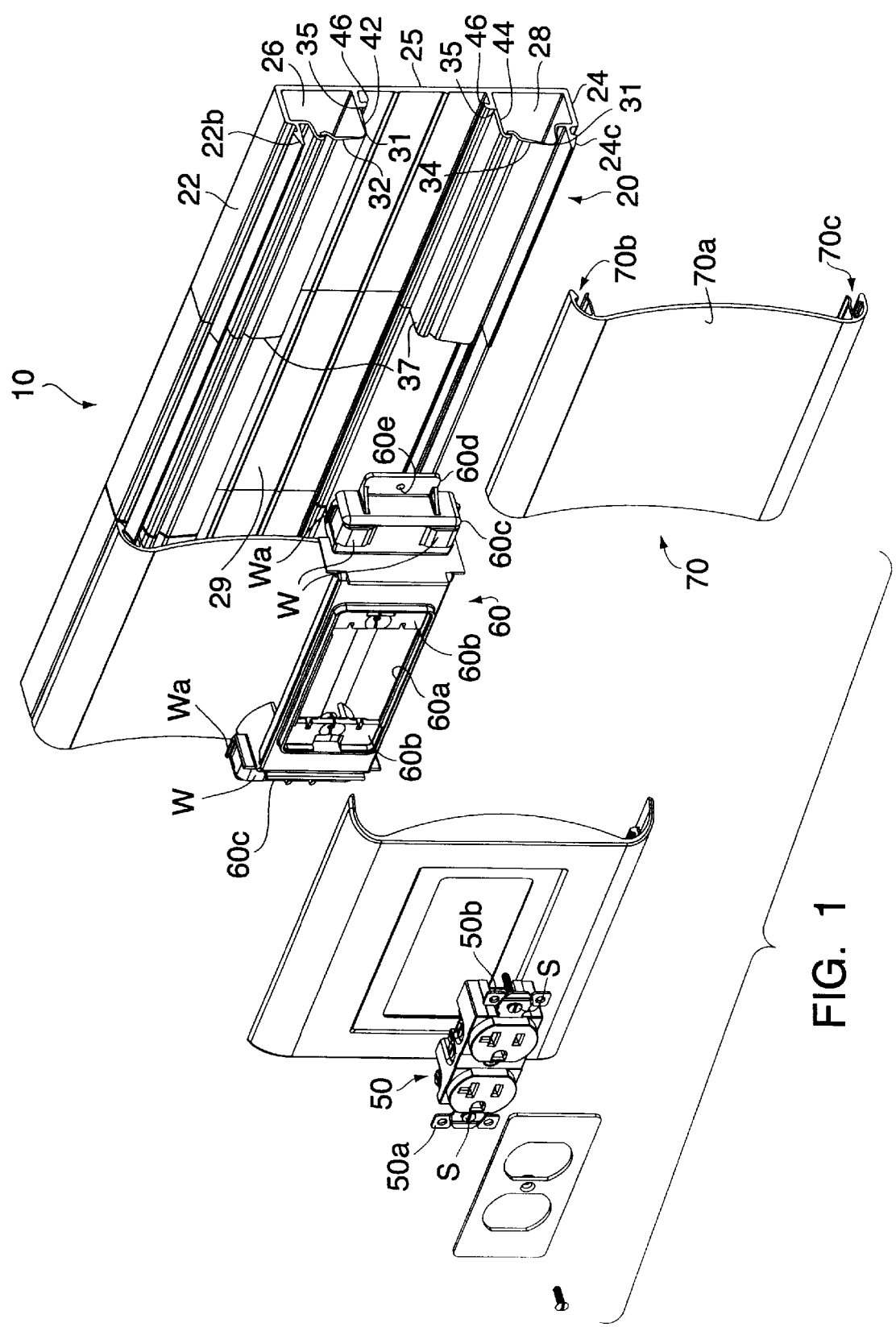
FIG. 1 shows in exploded relationship a linear raceway system constructed in accordance with the present invention.

Turning now to the drawings in greater detail, FIG. 1 shows in exploded relationship an elongated raceway base element 20 designed to be mounted on a wall structure (not shown) by conventional means, that is, by mounting directly to studs on the wall and providing a wall board material both above and below the raceway base in accordance with conventional techniques. The raceway base elements 20 may also be installed after the wall covering has been applied to the studs in accordance with known techniques.

Each elongated raceway base element has top and bottom edge portions 22 and 24, respectively, which are integrally molded with the back wall of the raceway base. Thus, the raceway base is of generally C-shape with a forwardly open recess that defines top and bottom channels 26 and 28, respectively, which top and bottom channels 26 and 28 are widely spaced relative to one another to prevent any possible electrical interference from the power lines provided in one of these channels into data or telecommunication cabling provided in the other channel.

These top and bottom channels 26 and 28, respectively, are further defined by integrally molded dividers 42 and 44 which are themselves spaced from one another to define a center or third channel in the raceway base.

As so constructed and arranged, the power lines or conductors (not shown) can be provided in one channel as, for example, the top channel 26, and the data communication cabling or fiber optic cabling are fed through the bottom channel 28 with the result that these different conductors are widely separated, one from another, and with the further advantage that the above-described configuration effectively eliminates the need for providing outlet devices in the raceway that carries the conductors. In FIG. 1, raceway channel 26 carries the power leads that are in turn connected to an outlet device 50 not provided in channel 26. Instead, the device 50 is provided in center channel 29.

In accordance with the present invention, the outlet device 50 is provided in a device bracket 60, preferably by simply pushing the device 50 into the space provided for this purpose in the device bracket as suggested by the opening 60a in the device bracket 60 which is provided for this purpose. More particularly, the end portions 50a and 50b of the outlet device 50 rest upon the shelf portions 60b in the device bracket 60, and the assembly screws or fasteners S,S can be pushed into slotted openings provided for this purpose in these shelves 60b all in accordance with prior U.S. Pat. No. 5,594,205.

Still with reference to the details of the device bracket 60, it will be apparent that opposed end portions 60c of the bracket 60 are provided with resilient integrally molded wings W that are formed with the device bracket but which are adapted to flex toward and away from one another and which define abutment edges at their free end portions as indicated generally at Wa.

FIGS. 9, 10, 11 and 12 show one end of the device bracket 60 of FIG. 1. In the area designated 62, and more particularly on the shelf portions 60b, 60b in FIG. 1, the invention of a prior U.S. Pat. No. 5,594,205 is incorporated to provide a snap-in feature for the outlet plug 50. The outlet plug device 50 has conventional screw fasteners 50b, 50b that can be pushed into openings 62b defined in these areas 62, 62 in accordance with the teachings of this '205. This prior U.S. Pat. No. 5,594,205 is incorporated by reference herein.

These abutments Wa of the wings W in the device bracket 60 flex inwardly toward one another when the device bracket is pushed into the center channel 29 of the raceway base 20. More particularly, these abutments Wa engage inwardly directed ribs 46, 46 defined for this purpose in the dividers 42 and 44 that extend the full length of the elongated raceway base 20. If necessary or desired, ears 60d at the end portions 60c of the device bracket 60 may be provided with openings 60e that serve to anchor the device bracket 60 not only to the raceway center channel 29, but further serve to anchor the entire assembly to the wall structure behind the raceway base 20.

Still with reference to FIG. 1, the channels 26 and 28 are preferably closed when the entire assembly has been installed so as to further protect and isolate the conductors and cabling which are provided therein. More particularly, the top channel 26 and its associated divider wall 42 has a shelf defining door 32 that is connected integrally to the divider and hence the raceway base by a hinged portion or linear region of flexible material 31. A further linear area of flexibility or hinge line is indicated generally at 35 in the divider wall 42 and facilitates hinging of the L-shaped shelf door and divider wall to allow opening of the door 32 so that the door 32 can serve as a shelf during installation of the wiring which is provided in the top channel 26.

The same construction applies to the bottom channel 28 wherein the L-shaped shelf or door 34 and/or the divider wall 44 can be flexed about the area or reduced section 35 for the same purpose, namely, to provide a shelf along which the cabling can be laid preliminary to snapping the door 34 shut and trapping the cabling therewithin.

In order to make the necessary electrical connections or other connections to the outlet device such as the outlet plug 50 described previously, the installer simply shears the divider wall 44 at the area of weakening 35 along a limited segment thereof, and shearing of the material along the lines indicated generally at 37 in FIG. 1 for example to allow the cabling provided in the top and bottom wireway channels to be extracted for connection with electrical devices or other outlet devices such as that illustrated at 50 in FIG. 1. It will be apparent that a generous radius is provided, as a result of the unique construction of the raceway disclosed herein so that fiber optic cabling can readily be accommodated in a raceway system in accordance with the present invention.

Figure 6:
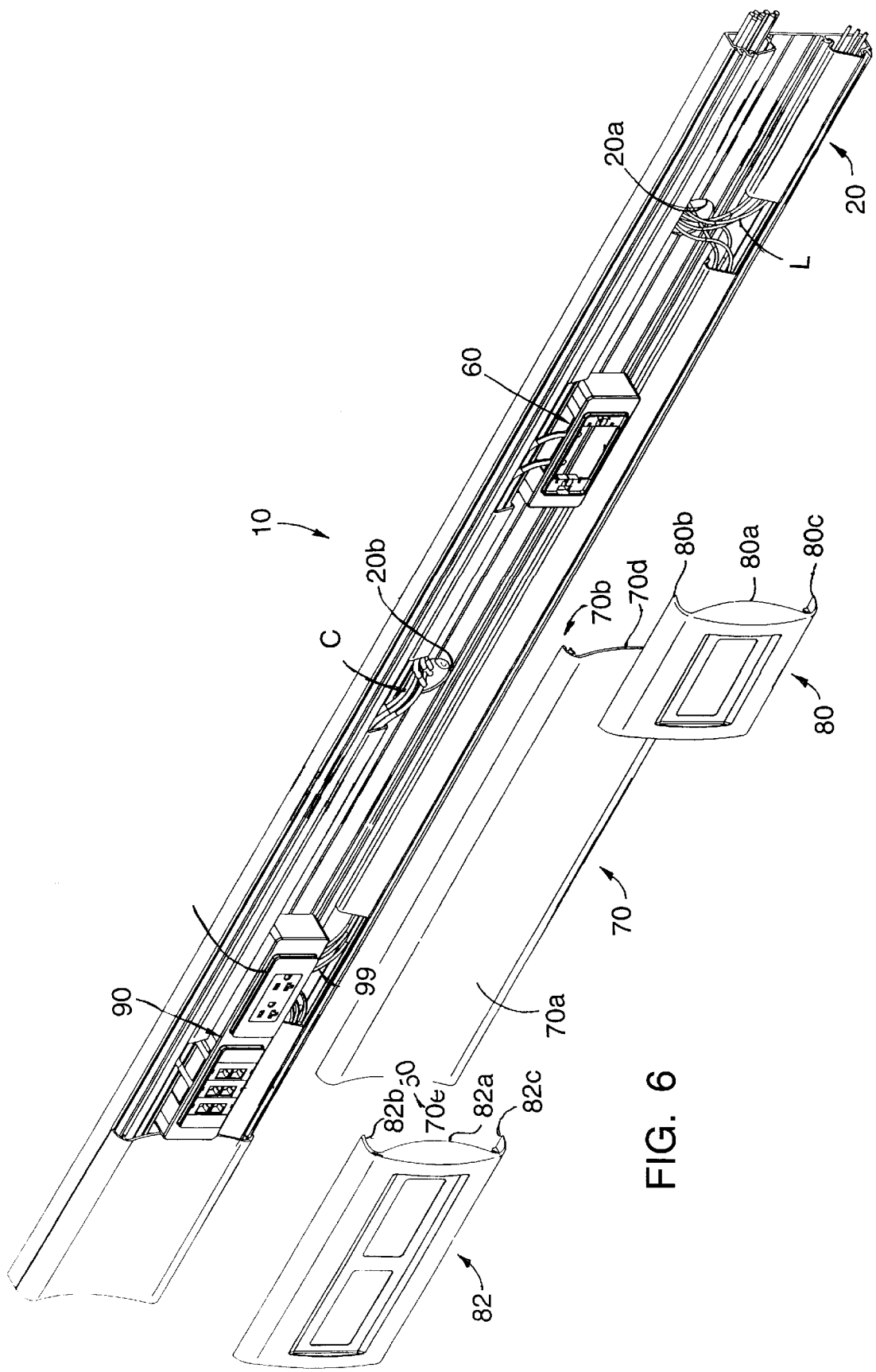
FIG. 6 is an exploded perspective view showing a raceway assembly of the present invention.

Turning now to a more detailed description of FIG. 6 the base 20 has an opening 20a through which the conductors L are fed into the lower channel 28 of the raceway 20. A similar opening 20b provides access for the cables C that are fed into the upper channel 26. All of these channels have integrally formed shelf/doors 32 and 34, and are further protected by the raceway cover components 70, 70 along the raceway base except where the device bracket projects beyond the concave surface 70a of the covers 70.

Figure 6A:
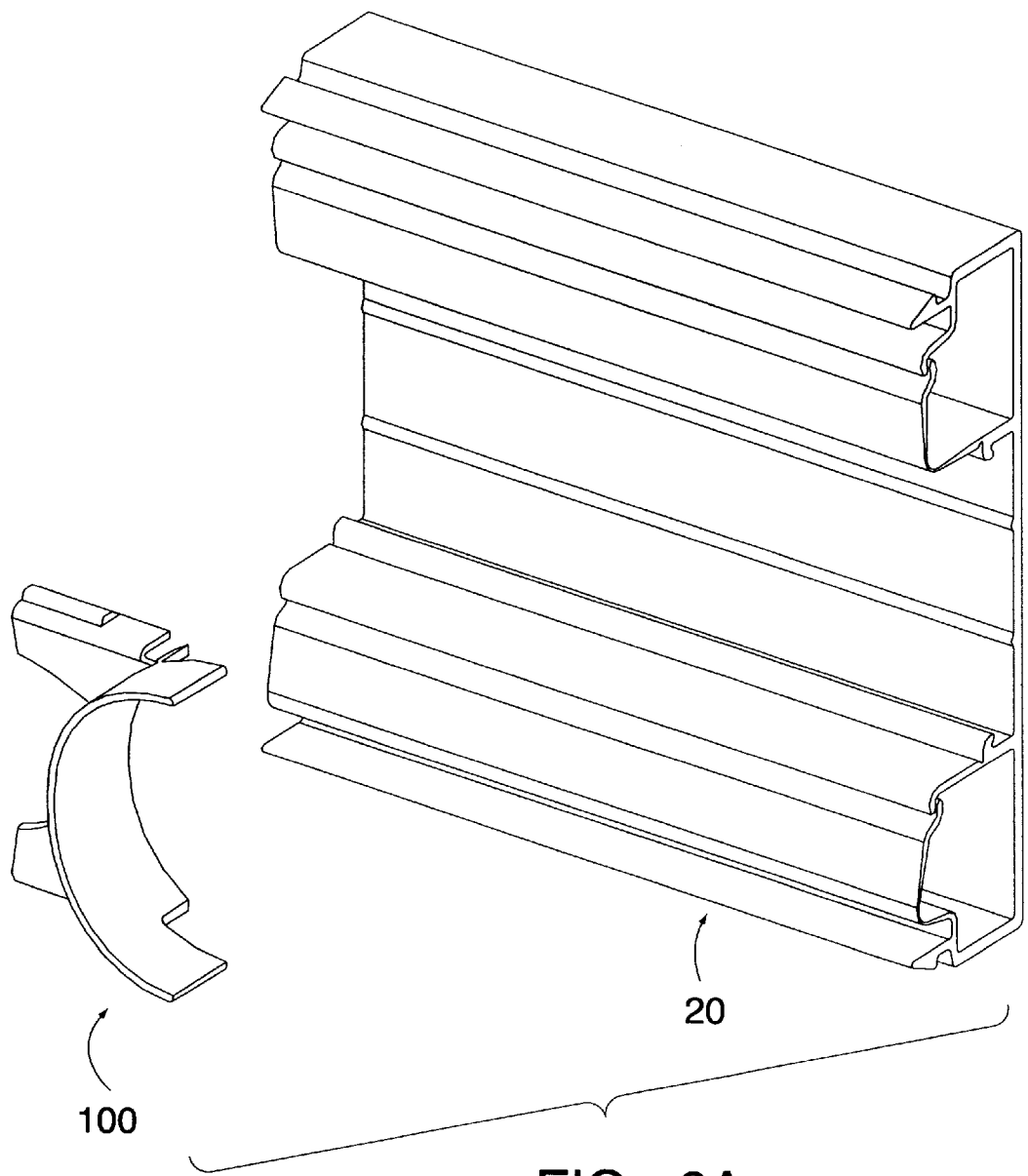
Figure 6B:
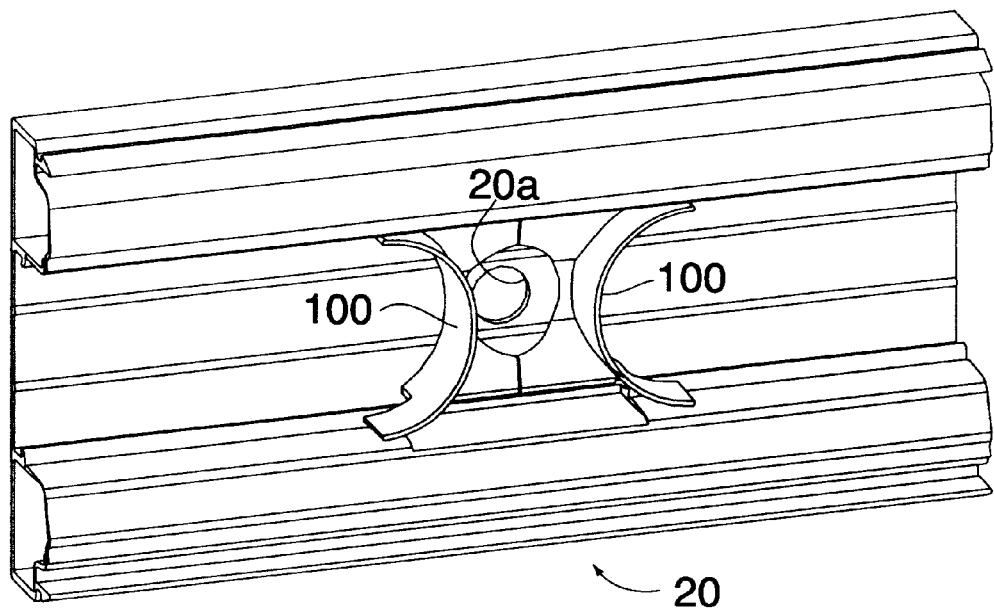
Figure 6C:
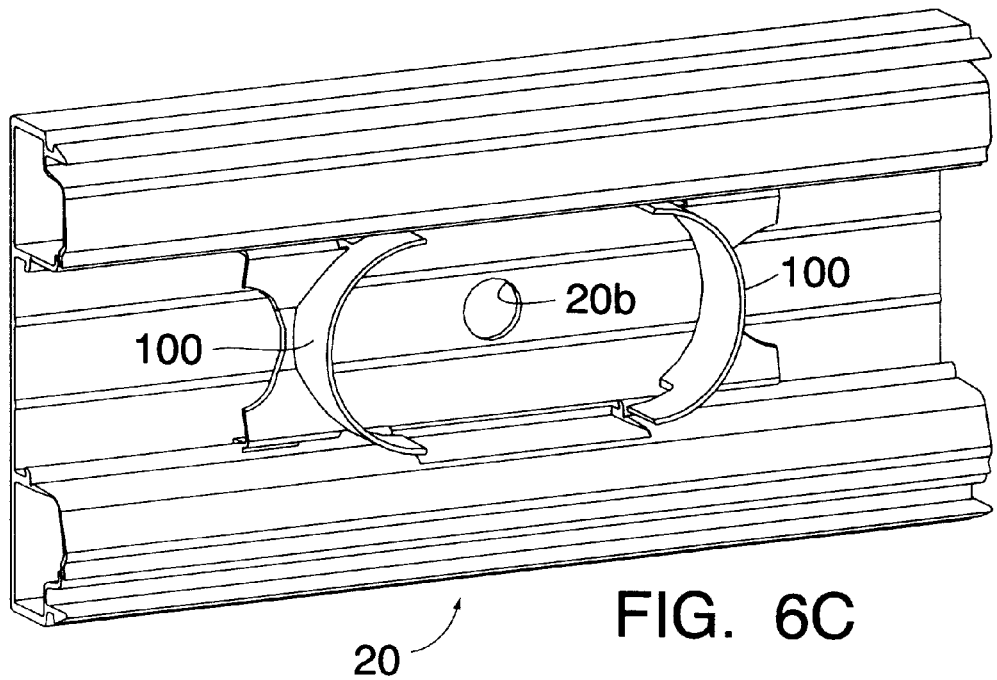

FIGS. 6A, 6B, and 6C show the raceway base 20 and the opening 20a or 20b for the conductors or cables. These views also show protective C-shaped clips 100 that are snapped into the same recesses behind the same ribs 46 that support the device brackets 60 and 90. The arcuate shape for the flanges 102 of these reversible clips serve to control the bending of the cables C, C and to protect them from harm both during installation and over long periods of time, including any required rewiring.

FIG. 6 shows the elongated raceway base element 20 with the top raceway channel having communication cabling C and with the bottom channel having power lines L contained therein. A single gang device bracket 60 is shown installed in the center channel of the raceway base, and cabling C provided to it so that the outlet devices mounted in the device bracket are in the form of those illustrated generally at 60 in FIG. 6. A two gang divided device bracket is illustrated at 90 in FIG. 6 with one side being similar to that of the single gang device bracket 60, and with the other side having an electrical outlet device similar to that shown at 50 in FIG. 1, the latter outlet device 50 being connected to the power lines L as suggested generally at 99 in FIG. 6.

It will be apparent that segments of the shelf defining doors provided in the top and bottom raceway channels can be cut away or sheared as described previously to facilitate interconnecting the various outlet devices to the proper cabling in the raceway base channels provided for this purpose. Referring now more particularly to the configuration of the raceway cover 70, not only is the outer surface thereof concave as mentioned previously, but the marginal edge portions 70b and 70c are provided with bifurcated marginal edge portions that are adapted to interact with molded abutment marginal edge portions 22b and 24c, of the base 20. This cover 70 can be snapped onto the base 20 and thereby enclose not only the top and bottom raceway channels 26 and 28, but also serves to close the center channel 29 all as described previously.

Still with reference to the exploded assembly of FIG. 6, it will be apparent that the cover components 70 are not co-extensive with the base, and instead are interrupted at each location for an outlet device. More particularly, the outlet device will create a gap in the area covered by the covers 70, 70 so that a trim ring such as the single trim ring indicated generally at 80 or the two gang trim ring indicated generally at 82 are required to be assembled with these outlet devices. As shown these trim rings preferably overlap the concave front face of the cover 70, and edge portions 80a, 82a of the trim rings 80 and 82, respectively, are so shaped as to provide a flush fit with the concave face of the cover 70. Each of these trim rings 80 and 82 further defines resilient marginal edge portions 80d, 80c and 82d, 82c which overlie the marginal edge portions 70b and 70c of the cover 70 so as to be conveniently assembled therewith in a snap fitting step which further speeds the rate at which the installer can provide a given room or wall structure with a raceway assembly all in accordance with the present invention. Alternatively, a conventional faceplate might be secured to the outlet device and in turn hold the trim plate in place.

It will, of course, be apparent that the edge portions 80a, 82a of the trim rings 80 and 82 of FIG. 6 could also be formed to fit against or to abut the adjacent ends 70d and 70e of the trim rings 80 82 so as to provide a more abrupt contrast between the concave raceway front face 70a and these trim rings. Such a design might be of advantage in a raceway system utilizing a more orthogonal concave cover construction than that which has been described with reference to the preferred embodiment.

As an alternative to providing the conductive leads L and C to their respective raceway channels in the raceway 20 as described with reference to FIG. 6, these conductors might instead be provided from a ceiling structure (not shown) downwardly through a corner or cornice raceway of the type having a divided interior suitable for this purpose. FIG. 2 shows such a corner or cornice raceway 100 as comprising a V-shaped base 102 having a divider wall 104, and preferably a complementary cover 106 which has a concave front face that matches the concave front face of the covers 70, 70 associated with the linear raceway described previously. However, the corner raceway 100 is preferably of somewhat smaller cross section than that of the raceway described previously with the result that an adapter 110 must be provided at the end of the raceway 10 as indicated generally at 110 so that one end of the adapter accommodates the horizontally extending raceway 10 and the other end of the adapter 110 accommodates the corner or cornice raceway 100.

Figure 3:
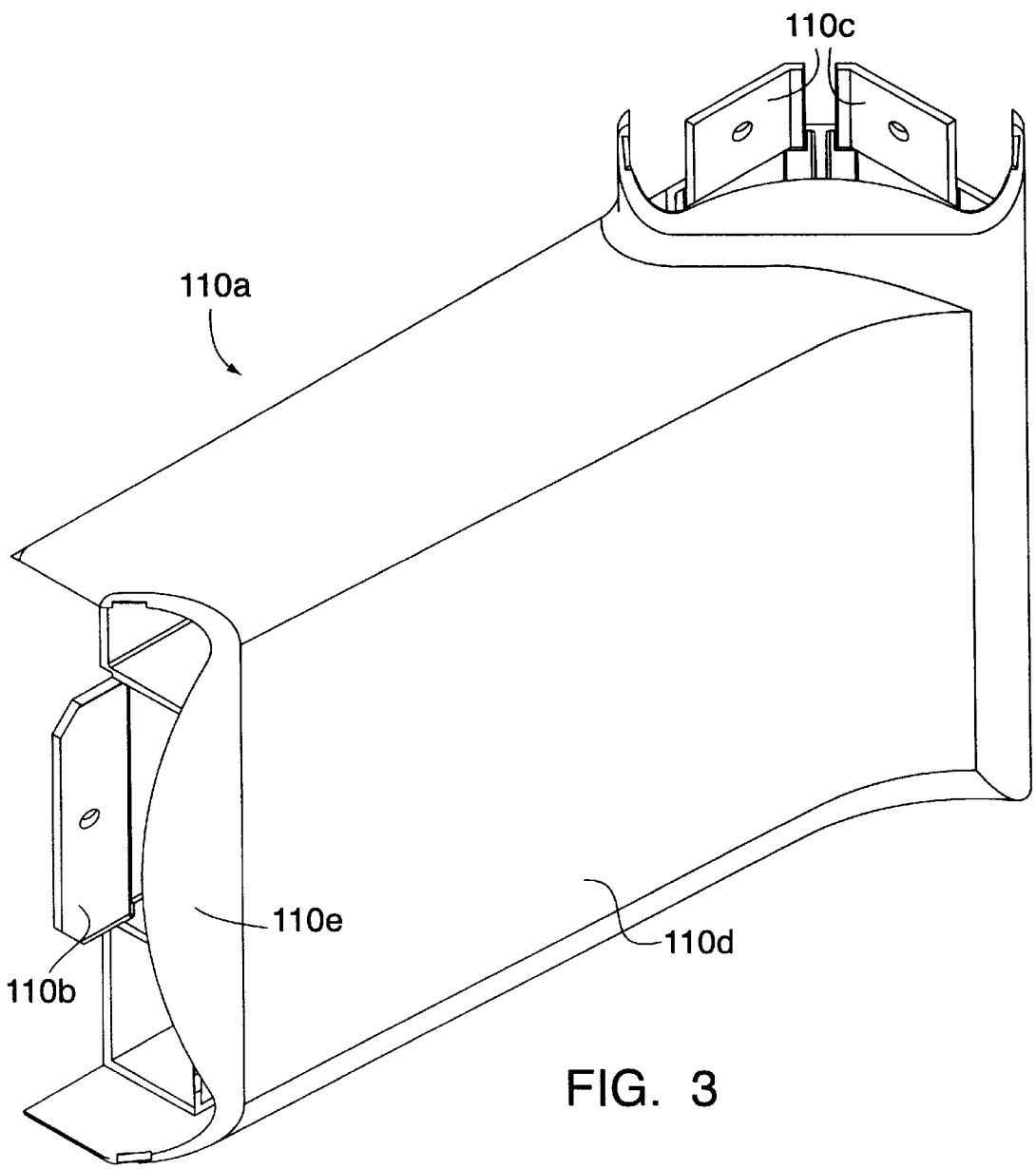
FIG. 3 is a detailed view of the connector portion of the raceway system used to interconnect the vertical drop of FIG. 2 with the linear raceway of FIG. 1.

FIGS. 2 & 3 show the adapter 110a in a left-hand version whereas FIG. 2 shows a right-hand version, and it will be apparent that this adapter 110 or 110a is preferably made in a two-piece configuration where the base portion defines forwardly projecting divider walls that are aligned with the dividers provided for this purpose in the raceway base 20. Tab 110b is provided to secure the base of the adapter 110a to the underlying raceway base 20 by conventional fastener means (not shown). Additional tabs 110c are provided for securing the corner raceway 100 to the adapter 110 in a similar fashion. It is further noted that the adapter cover portion 110d has a contour similar to that of the trim rings 80 and 82 described previously with the result that inwardly curved end portion 110e provide a mating connection to the underlying concave cover all as shown in FIG. 2.

FIG. 2A shows the various components of the adapter which is described above with reference to FIG. 2, but what these components provided in an exploded relationship in order to better illustrate the internal divider walls that serve to align the dividers of the base of the raceway with the segmented double-wireway channel of the cornice base. It will be noted that these dividers 110f and 110g are of convoluted contour so as to afford maximum turning radius for the cables or wiring provided in the individual wireway channels of the raceway base 10. More particularly, where fiber optic cabling is to be provided in one or the other or both of these wireway channels it is advantageous to provide a maximum bending radius for these cables.

FIG. 3 shows the adapter itself as including tabs to properly meet the adapter with both the raceway assembly (base and cover) and with the raceway cornice base and cover respectively.

Figure 4:
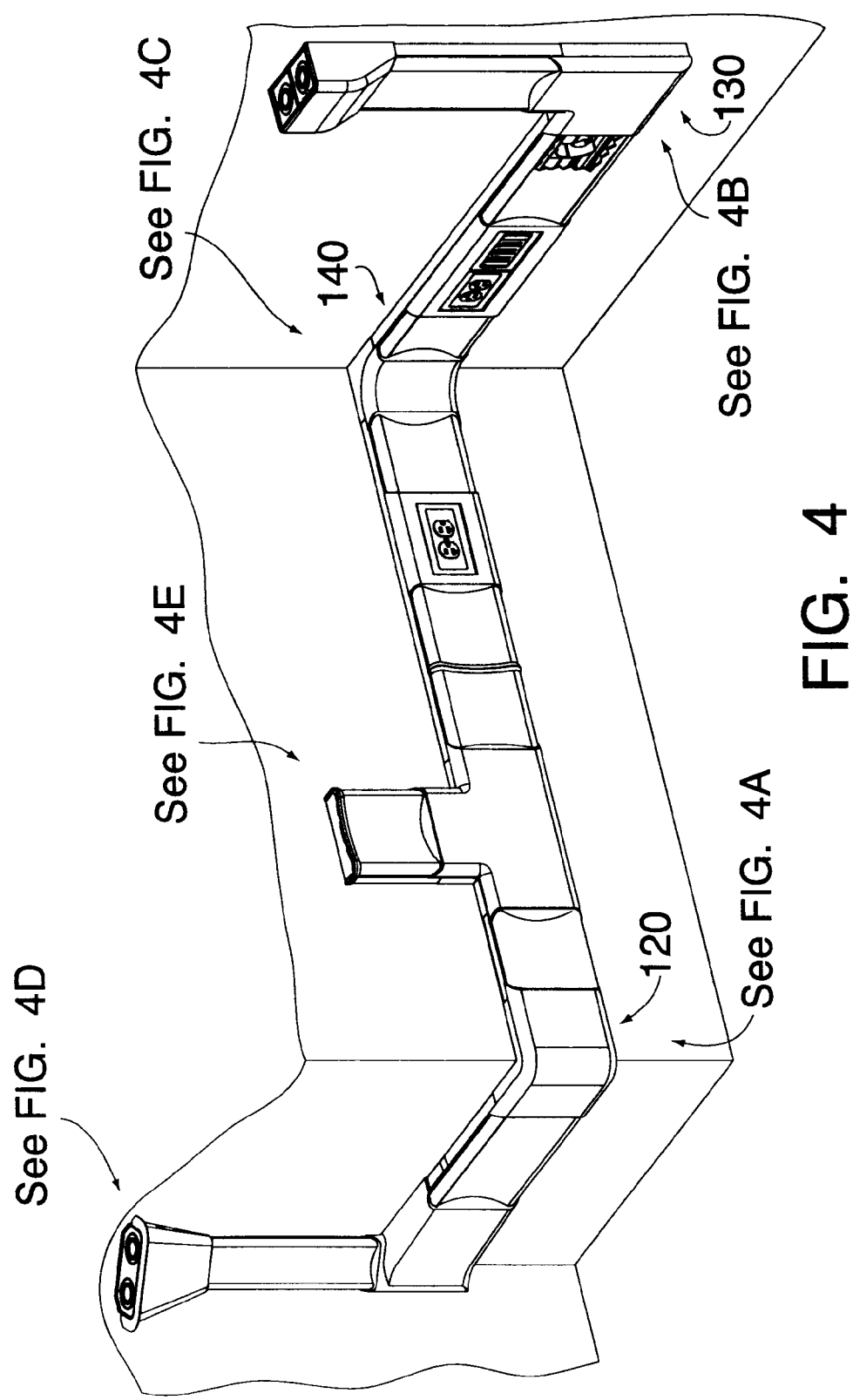
FIG. 4 illustrates in schematic fashion the installation of a raceway system in accordance with the present invention showing an arrangement where both internal and external corner connectors are provided as well as T-shaped and L-shaped elbow connectors for such a raceway system.

Referring now to FIG. 4, the raceway assembly further comprises internal and external corner adapters as well as L-shaped and T-shaped adapters that serve to allow running of the raceway not only horizontally around the room defined by the wall structure shown, but also afford vertical runs that can prove an advantage in the environment of a typical office coral. Here again and as with the above-described adapter 110, each of the interior corner and exterior corner adapters is preferably formed as a two-piece unit with a back plate or a base portion having dividers aligned with those provided in the elongated raceway base itself, and each corner adapter further includes cover components which preferably have a flat front face and therefore include offset end portions so contoured as to provide a flush fit with the concave raceway cover as described previously with reference to adapters 110 and 110a.

Figure 4A:
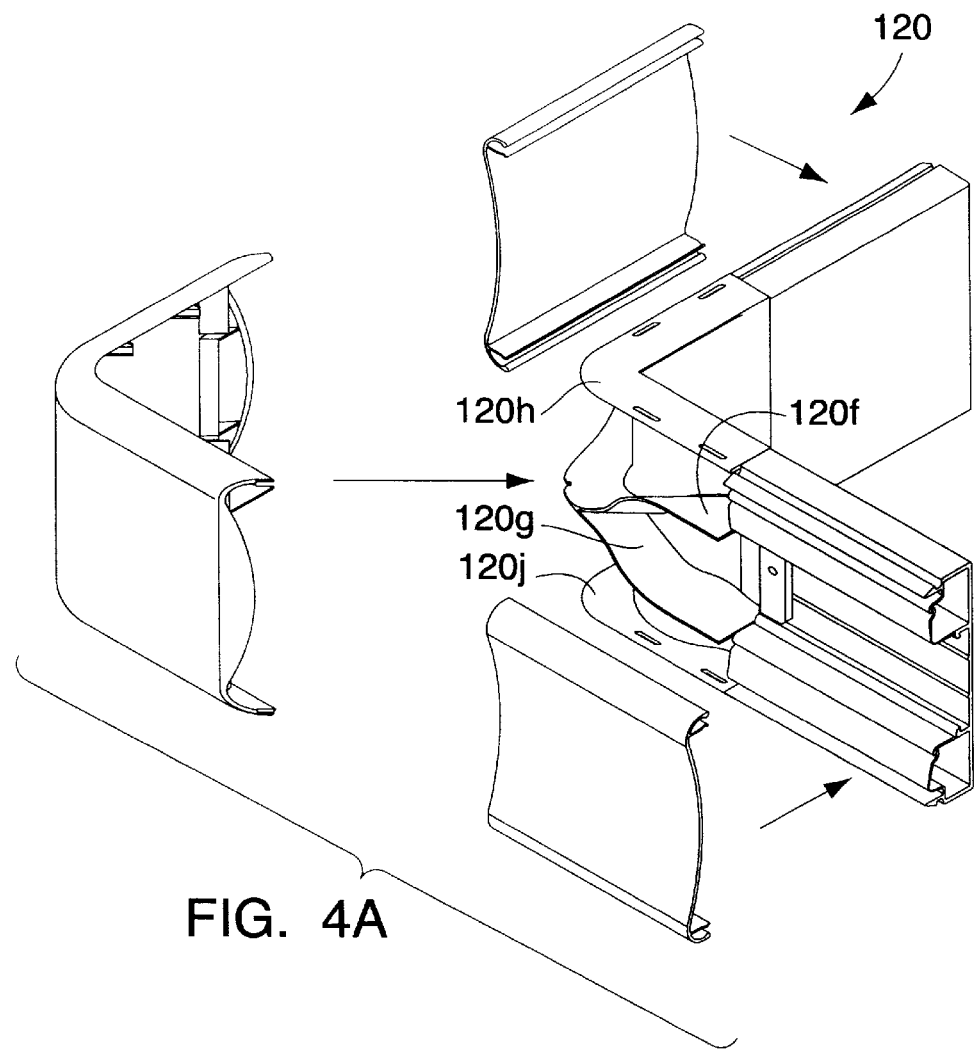
FIG. 4a shows the external corner structure of FIG. 4 but with the cover components depicted in an exploded relationship to one another.

FIG. 4A shows the various components of an external raceway corner assembly with the cover portions in an exploded relationship to the base components. Here again, the dividers 120f and 120g are intended to provide a maximum bending radius for the cables contained in the wireway channels at the top and bottom of the raceway leading into this external corner.

Figure 4E:
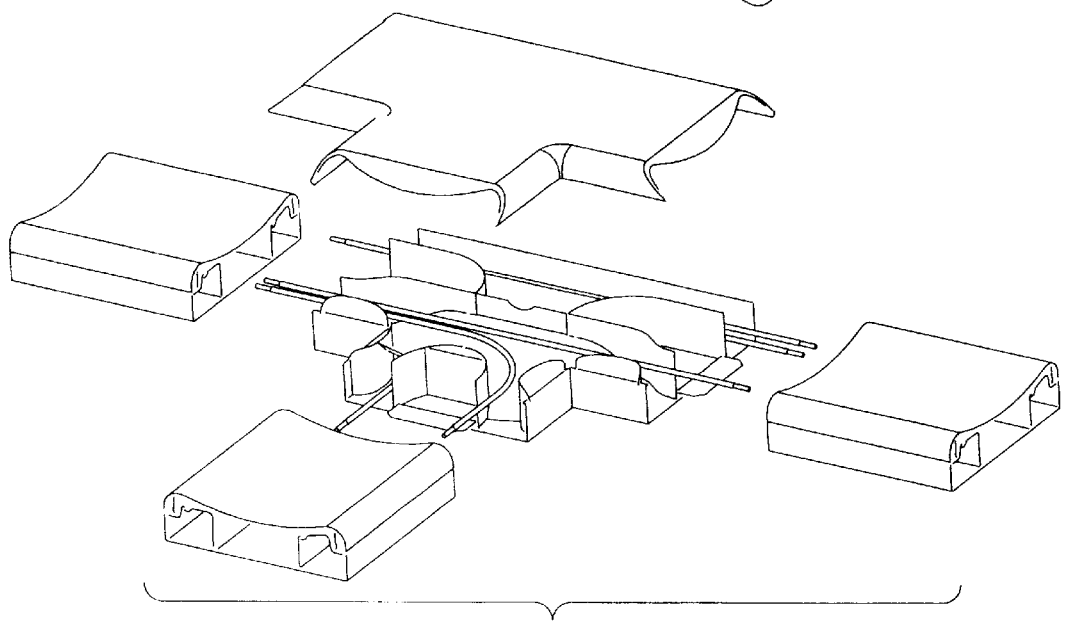
Figure 4B:
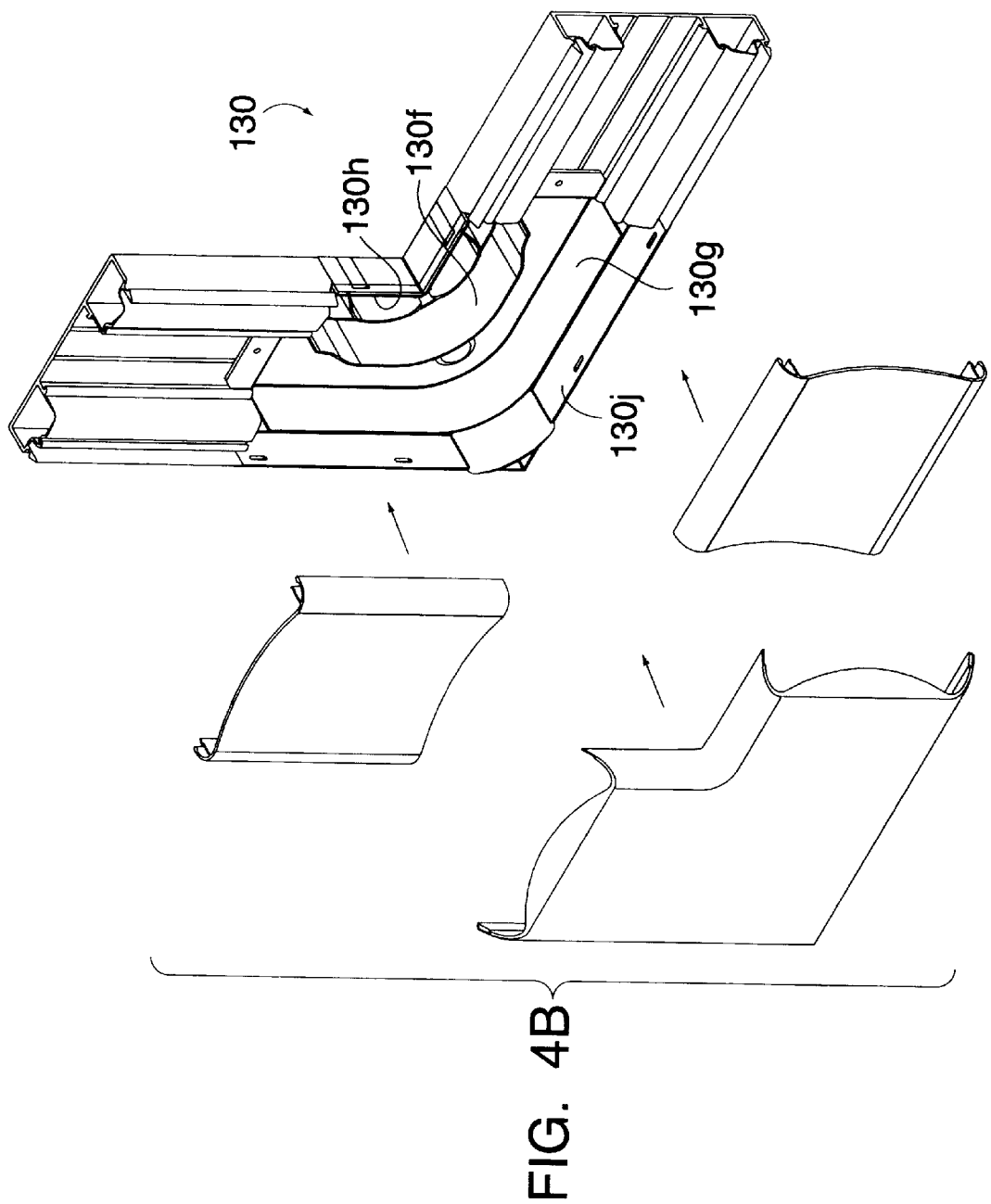
FIG. 4b shows the vertical L-shaped elbow of FIG. 4, but with the cover components depicted in exploded relationship relative to one another.

FIG. 4B shows the same elements of a raceway corner of the surface type, that is defining an L-shaped assemblage of intricately perpendicular raceway components provided on a wall structure as indicated for example at 130 in FIG. 4. Here again, the dividers 130f and 130g are intended to provide a maximum bend radius for the cables contained in the wireway channels of the raceway system.

Figure 4C:
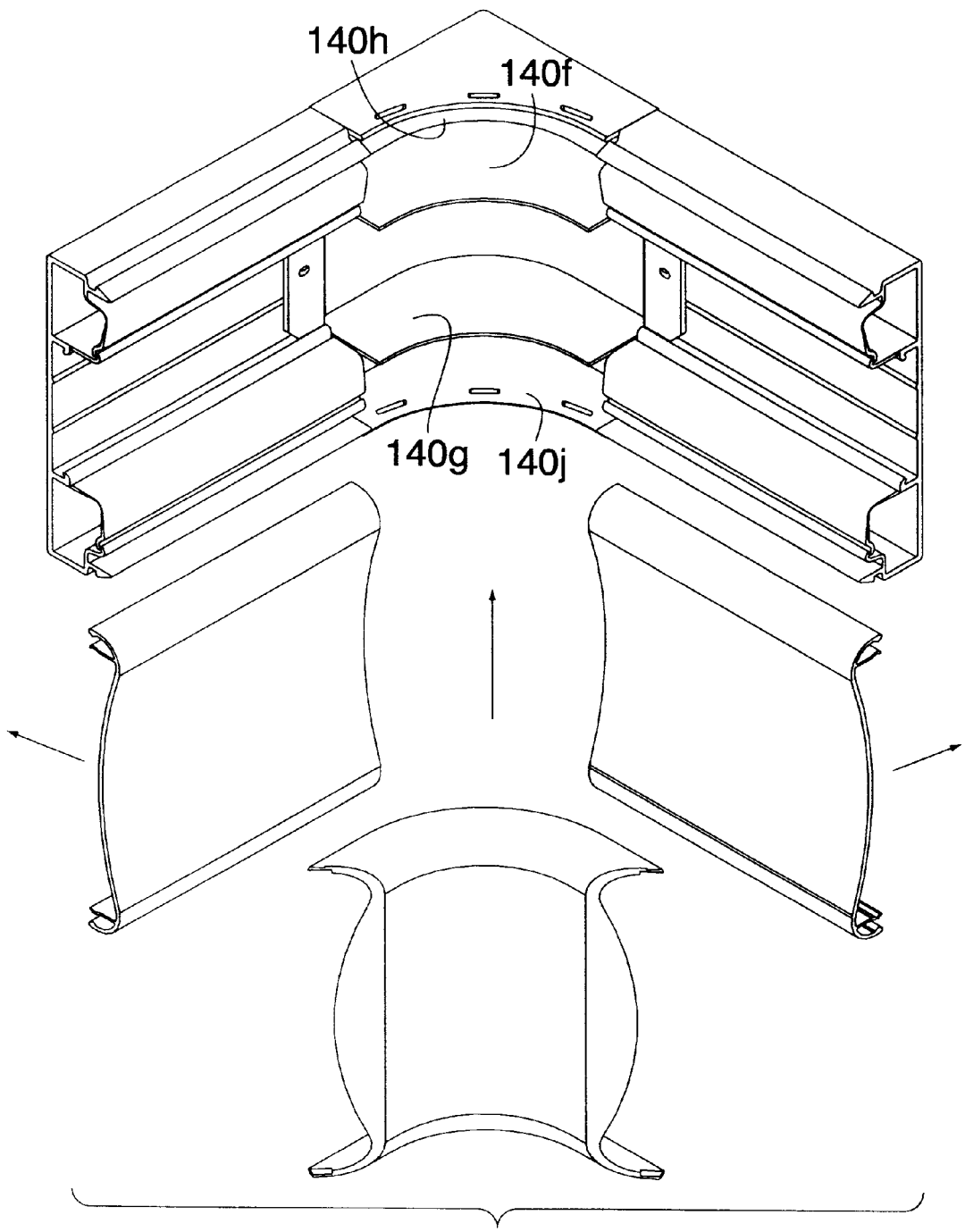
FIG. 4c shows the internal corner of FIG. 4 but with the cover components provided in an exploded relationship relative thereto.

FIG. 4C shows essentially the same dividers 140f and 140g contained in an internal raceway base corner similar to that depicted at 140 in FIG. 4.

Figure 4D:
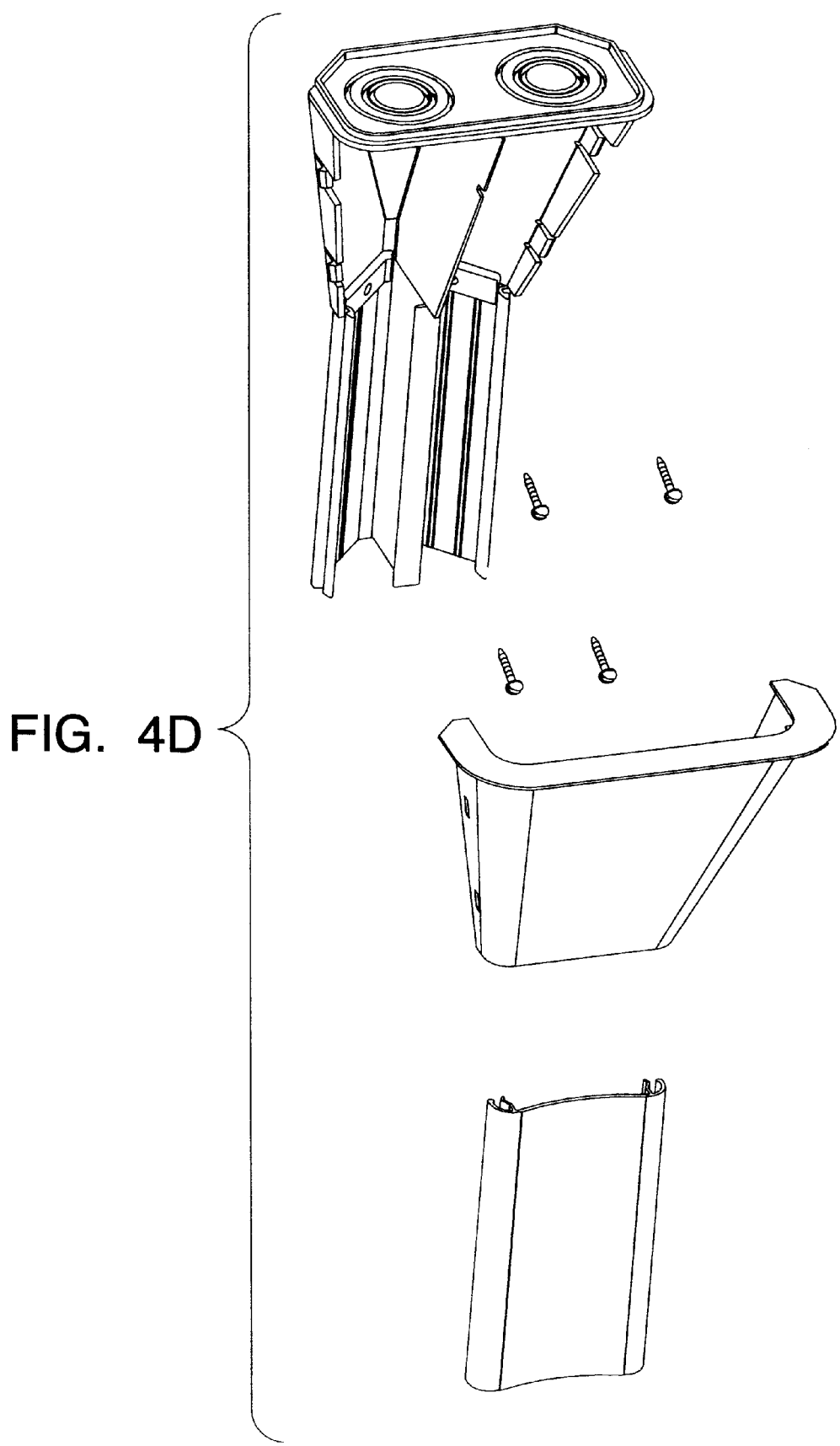

FIG. 4d shows the ceiling drop for the raceway corner 100 of FIG. 2 and FIG. 2a, and illustrates the separated wireway channels carried from above the ceiling into the corner raceway 100. FIG. 4e shows the tee for the raceway of FIGS. 2 and 2a with the components in exploded relationship.

Figure 5:
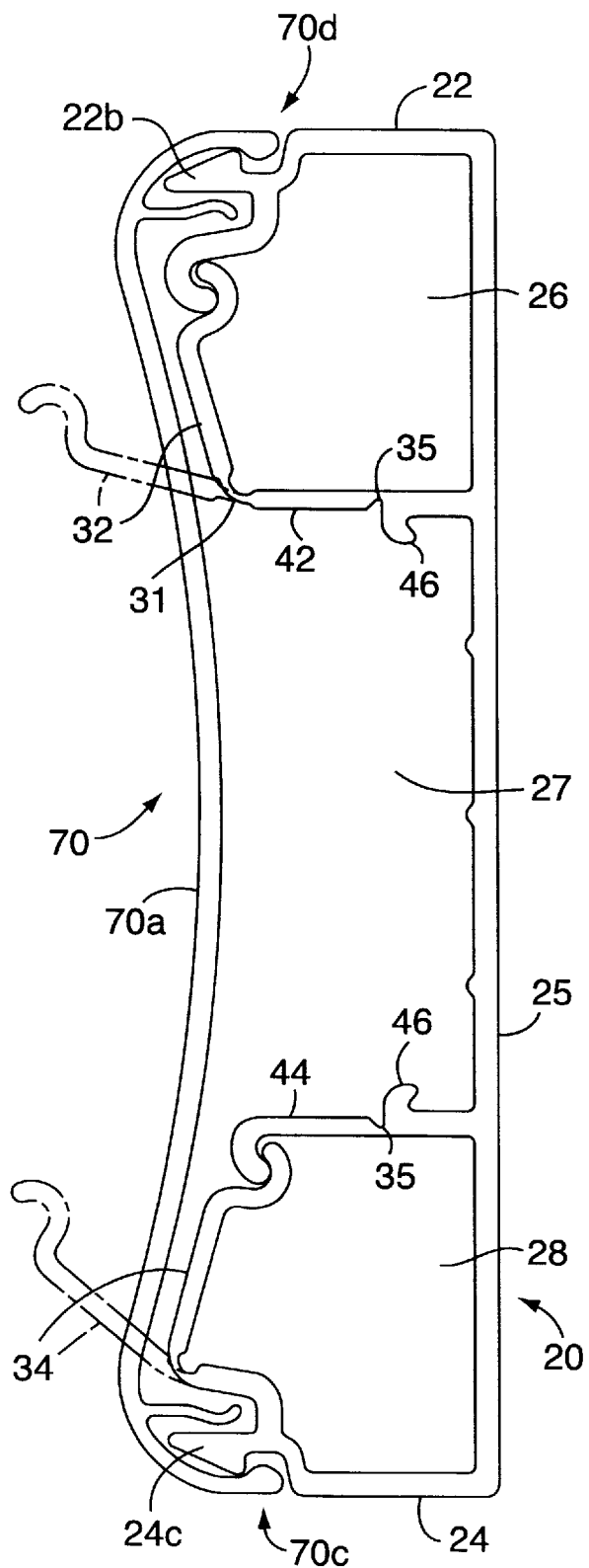
FIG. 5 shows in cross section the configuration of the linear raceway system illustrating the top and bottom channels for the conductors, and the center channel provided therebetween for mounting the electrical and other devices which will be accommodated in this raceway system portion of the dividers are shown open in phantom lines. A cover is also shown in assembled relationship with the raceway base.

FIG. 5 shows the cross sectional configuration for the raceway base in some detail, and also illustrates in broken lines the open positions for the shelf or door defining portions of the dividers. All of these components are integrally molded so as to provide a one-piece construction that is not only economical to manufacture but that is constructed and arranged so as to provide a convenient area of weakening not only for the hinge line portion of the L-shaped door/divider, but also for facilitating shearing of these areas as required to accommodate the wiring of various outlet devices as described previously.

Figure 7:
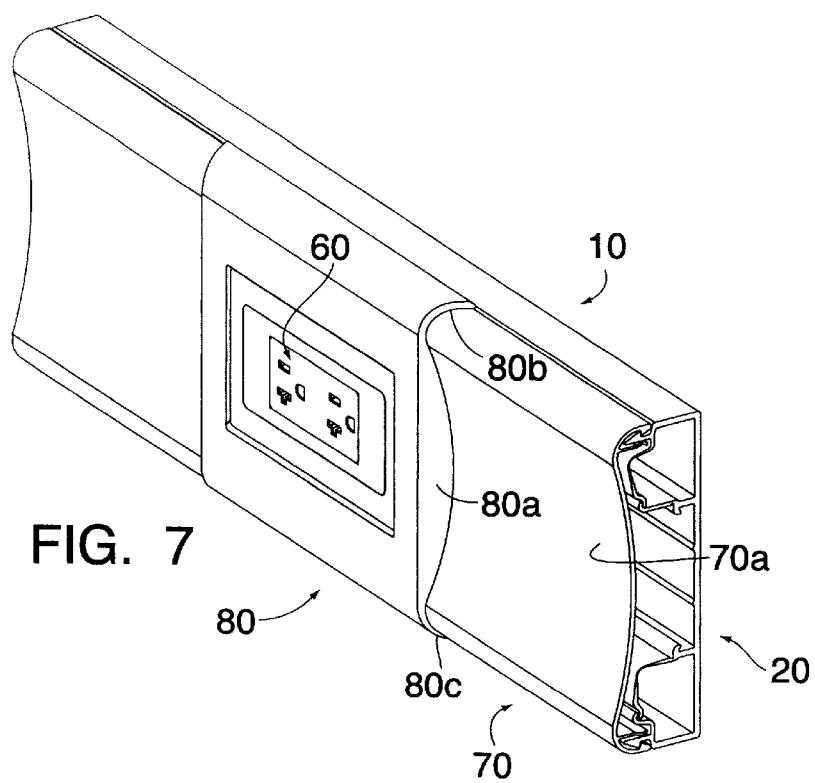
FIG. 7 is a front top perspective view of a linear raceway fitted with an electrical outlet device and associated trim plate all in accordance with the present invention.

FIG. 7 shows an assembled raceway base and cover together with the trim ring associated with an electrical outlet device of the type previously described with reference to FIG. 1.

Although the present invention is described with reference to a continuously extruded raceway base and cover combination, it will be apparent that other variations of this construction will occur to those skilled in the art.

For example, a combination metal and polymeric raceway assembly can be provided with the base fabricated from a metal material such as steel or aluminum, and with the cover similarly made from such metal material with marginal edge portions of each so fabricated as to provide a snap fit therebetween. such a construction can benefit from an extruded polymeric insert for the base where the L-shaped divider and door portions are integrally molded in the polymeric insert, that can be foreshortened to define only the third or center channel in the raceway itself.

Figure 8:
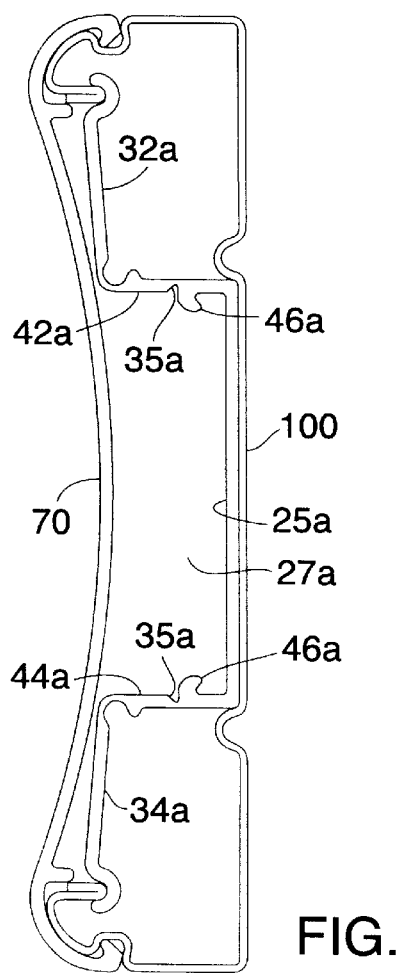
FIG. 8 is a view similar to FIG. 5 but showing an alternative configuration for the cross-section of the linear raceway base and cover components, the base being illustrated as made of up both a plastic or polymeric component and a formed metal base component.
Figure 9:
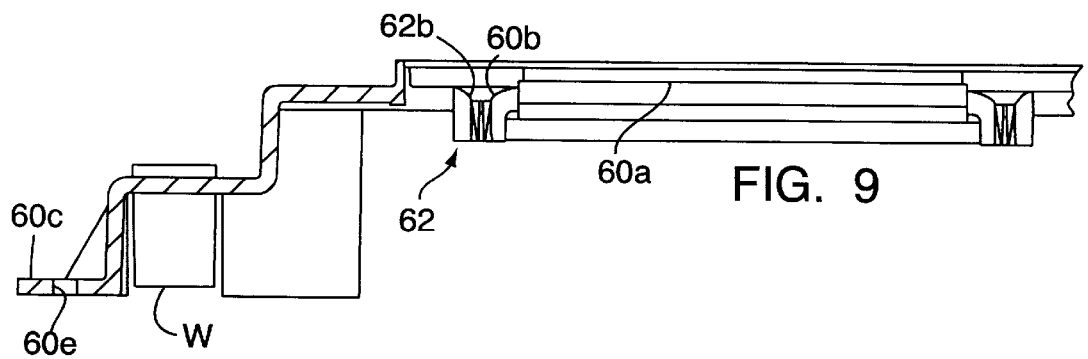
FIG. 9 is a horizontal section showing one side of the device bracket 60 of FIG. 1.
Figure 10:
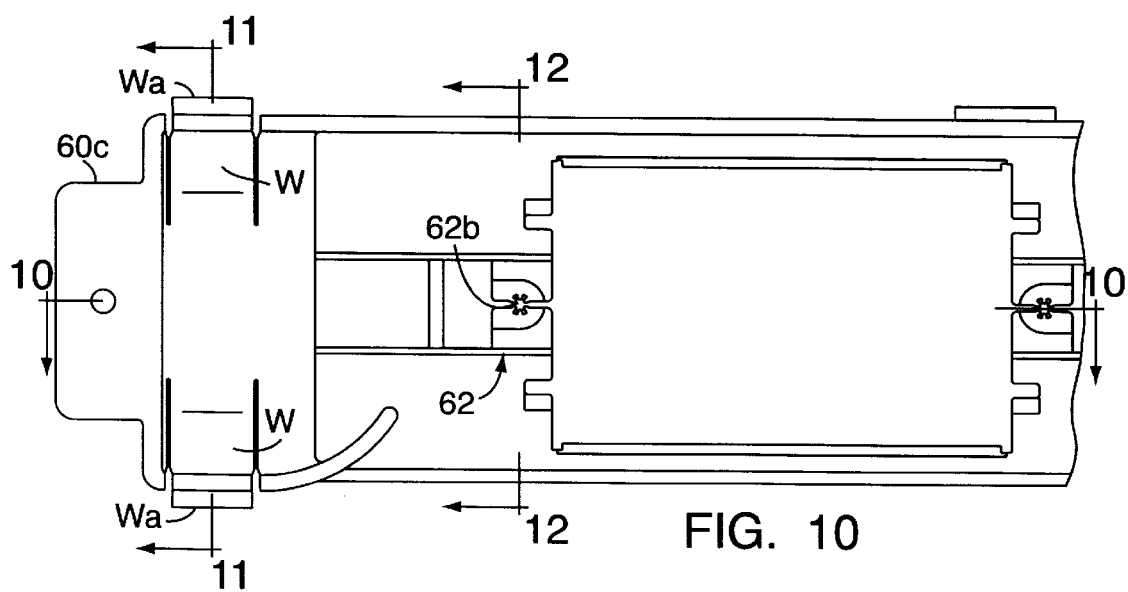
Figure 11:
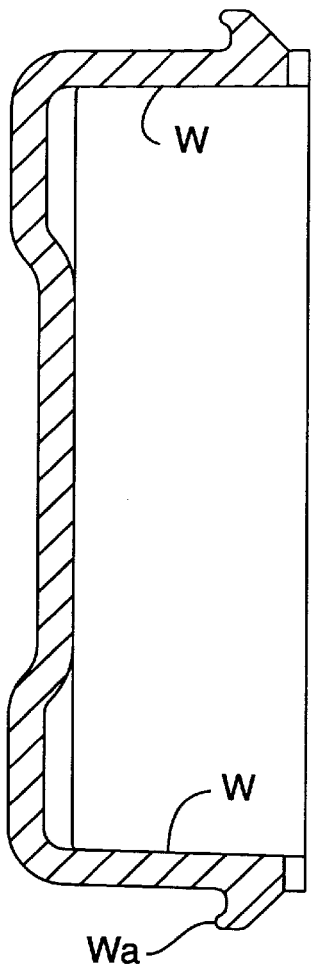
FIG. 11 is a sectional view on the line A—A of FIG. 10.
Figure 12:
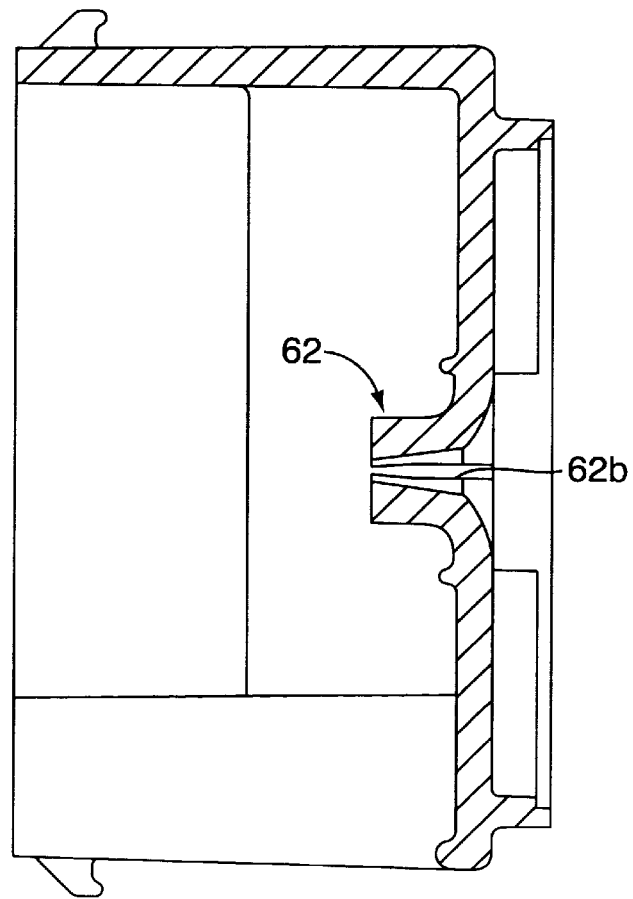
FIG. 12 is a sectional view on the line B—B of FIG. 10.

Such a construction is illustrated in FIG. 8 and has the structural rigidity of a steel raceway without loss of the many advantages afforded by the present invention. The cover 70 is identical to that described above. The base element includes a metal channel 100 having marginal edges that receive the edges of the cover 70. In the event that aluminum were to be provided for the base and cover, the divider walls might instead be provided of aluminum and integrally extruded in the base so that the only polymeric material used would form only the doors of the top and bottom raceway channels, respectively.

The polymeric base portion has a rear wall 25a and integrally formed divider walls 42a and 44a that cooperate with doors or shelves 32a and 34a respectively, such that they define L-shaped structure similar to that described above with reference to the raceway of FIG. 5.

In light of the above, it is therefore understood that within the scope of the appended claims, the invention may be practiced otherwise than as specifically described herein. The appended claims together with the rights afforded under the Equitable Doctrine of Equivalents are relied upon as determining the metes and bounds of the subject invention.

What is claimed is:

1. A wall mountable raceway system comprising:
    elongated raceway base elements, each of which has a rear wall adapted for mounting said base elements to a wall structure, said base elements including marginal edge portions defining top and bottom boundaries for a first elongated raceway channel and a second elongated raceway channel respectively, raceway divider means defining a third elongated channel between said first and second raceway channels,
    elongated raceway cover components having marginal edge portions that interact with said marginal edge portions of said base elements for enclosing said third channel, and
    elongated shelf defining doors provided on said base elements at hinge line defined by said base elements.

2. The system of claim 1 wherein said raceway divider means comprises dividers integrally formed in said raceway base elements.

3. The system of claim 2 wherein said dividers and doors define an L-shape, said L-shape together with said top and bottom boundaries for said first and second raceway channels further define said first and second raceway channels, respectively.

4. The system of claim 1 wherein said third channel is defined between said first and second raceway channels by said divider means, each said base element further defining elongated ribs adjacent said raceway base element, and rear wall, and device brackets for supporting devices to be wired from conductors in said first or second channels, said device brackets having resilient integrally molded wings received by said ribs to secure said device brackets in said third channel.

5. The system of claim 4 wherein said divider means comprise raceway dividers integrally molded with said base elements and having elongated regions of reduced cross section to facilitate shearing segments thereof from said base elements for accommodating wiring between said devices and conductors in said first or second channels.

6. The system of claim 5 wherein said raceway dividers and doors are integrally formed in said base elements.

7. The system of claim 6 wherein said raceway dividers and doors are L-shaped, said L-shaped dividers and doors together with said top and bottom boundaries for said first and second raceway channels further defining said first and second raceway channels, respectively.

8. The system of claim 7 wherein said cover components define a concave front wall with cutouts for said device brackets, and a trim plate that abuts said cover components and that accommodates a cover plate for a device so mounted in one of said device brackets.

9. The system of claim 8 further comprising internal and external corner raceway base elements, and internal and external corner raceway cover components, said corner raceway base elements having protruding top and bottom marginal edge portions as well as integrally formed dividers for alignment with said base element marginal edge portions and dividers respectively, and internal and external raceway corner cover components which do not define a concave outer face said raceway corner components having end portions that abut said raceway cover.

10. The system of claim 9 further comprising L-shaped and T-shaped raceway elbow assemblies comprising:
    elbow base elements having protruding inner and outer edge portions as well as integrally formed dividers for alignment with said base element marginal edge portions and raceway dividers respectively, and L-shaped and T-shaped raceway elbow cover components which do not define a concave outer face that matches that of said raceway cover components, said elbow cover components having end portions that abut said raceway cover components.

11. In a raceway system having elongated raceway base elements, each of which includes a rear wall adapted to be mounted to a wall structure, and top and bottom marginal edge portions that receive a cover, the improvement comprising:
    at least two dividers in each said base element defining an elongated channel therebetween, said at least two dividers cooperating with the top and bottom marginal edge portions of the base element to define elongated top and bottom wireways above and below said elongated channel,
    and device brackets having resilient wings that are engageable with ribs formed by said channel defining base element for mounting said device brackets in said elongated channel.

12. The improvement of claim 11 further characterized by lines of weakening in said dividers to allow segments to be sheared therefrom and to allow wiring in said top or bottom wireways to be fed to a device mounted in one of said device brackets.

13. The improvement of claim 12 wherein said doors are integrally molded to at least one of said two dividers to further define said top and bottom wireways.

14. The improvement of claim 13 further including trim plates fitted over said device brackets, and overlying spaced end portions of said cover components.

15. The improvement of claim 11 wherein said dividers are integrally formed in said raceway base elements.

16. The improvement of claim 15 further including cover components with marginal edge portions that are adapted to be received by the marginal edge portions of said base elements, said cover components enclosing said third channel except where gaps are provided to receive said device brackets.

17. A raceway system comprising:
    elongated raceway base elements, each said base element having a rear wall adapted for mounting said base element to an existing structure, said base element including marginal top and bottom walls that define top and bottom raceway channels respectively,
    said raceway base elements defining a third channel between said top and bottom channels, and said base elements defining ribs, and
    device brackets for supporting devices to be wired from conductors in said top and bottom raceway channels,
    said device brackets having resilient integrally molded wings received by said ribs to secure said device brackets in said third raceway channel.

18. The system of claim 17 further comprising dividers having elongated regions of reduced cross section to facilitate shearing segments for accommodating wiring between said devices and conductors in said top and bottom raceway channels.

19. The system of claim 18 wherein said raceway dividers are integrally formed in said raceway base elements.

20. The system of claim 19 further comprising raceway cover components having marginal edge potions that interact with marginal edges of said top and bottom walls for enclosing said top, bottom and third channels.

21. The system of claim 17 wherein said device brackets have means for receiving electrical devices in openings defined by said device brackets, and wherein said means include fastener openings for slidably receiving fasteners associated with said electrical devices, said fastener openings having resilient portions for engaging the threads of said fasteners so as to require unthreading of said fasteners to remove said electrical devices after allowing the electrical devices to be assembled in a push-in manner of assembly that requires no such threading operation.

22. The system of claim 17 wherein means is provided in part on said device bracket and in part on said device for resiliently accepting a projection on one of said device bracket and device to be received in a opening defined by the other of said device bracket and device.

23. A raceway system comprising:
    elongated raceway base elements, each base element having top and bottom marginal edges, and a rear wall adapted for mounting said base element to an existing structure,
    raceway cover components having marginal edge portions that mate with said top and bottom marginal edges of said base elements, divider means defining a central elongated channel between said top and bottom marginal edges of said raceway cover components and said raceway base elements, and defining top and bottom wireways for conductors of different varieties, device brackets for supporting electrical devices to allow wiring the electrical devices to the conductors in said wireways, means for securing said device brackets in said central raceway channel and said divider means having gaps for the conductors to be run from said wireways to the electrical devices provided in said device brackets, said means including ribs defined by the divider means and integrally molded wings defined by the device brackets.

* * * * *